United States Patent
Ai et al.

(10) Patent No.: US 9,673,882 B2
(45) Date of Patent: *Jun. 6, 2017

(54) ANTENNA, BASE STATION, AND BEAM PROCESSING METHOD

(71) Applicant: Huawei Technologies Co., Ltd., Shenzhen (CN)

(72) Inventors: Ming Ai, Shenzhen (CN); Weihong Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 996 days.

This patent is subject to a terminal disclaimer.

(21) Appl. No.: 13/867,497

(22) Filed: Apr. 22, 2013

(65) Prior Publication Data

US 2013/0278460 A1    Oct. 24, 2013

Related U.S. Application Data

(63) Continuation of application No. 13/592,149, filed on Aug. 22, 2012, now Pat. No. 8,462,047, which is a
(Continued)

(51) Int. Cl.
*H04B 7/06* (2006.01)
*H01Q 3/40* (2006.01)
(Continued)

(52) U.S. Cl.
CPC ............ *H04B 7/0686* (2013.01); *H01Q 1/246* (2013.01); *H01Q 3/40* (2013.01); *H01Q 21/22* (2013.01); *H04B 7/0617* (2013.01)

(58) Field of Classification Search
USPC ................................ 342/368, 372, 373, 378
See application file for complete search history.

(56) References Cited

U.S. PATENT DOCUMENTS

| | | | |
|---|---|---|---|
| 4,268,829 A | 5/1981 | Baurle et al. | |
| 4,638,317 A | 1/1987 | Evans | |

(Continued)

FOREIGN PATENT DOCUMENTS

| | | | |
|---|---|---|---|
| CN | 1220787 A | 6/1999 | |
| CN | 1553725 A | 12/2004 | |

(Continued)

OTHER PUBLICATIONS

Gao et al., "Integrated multibeam dual-polarised planar array" IEEE Proc.-Microw. Antennas Propag., vol. 148, No. 3, Jun. 2001, pp. 174-178.

(Continued)

*Primary Examiner* — Dao Phan
(74) *Attorney, Agent, or Firm* — Brinks Gilson & Lione

(57) ABSTRACT

The present disclosure provides an antenna, a base station, and a beam processing method. The method includes: performing, by a hybrid network, phase adjustment for signals received from a transceiver, generating signals having a preset phase, and sending the signals to a power dividing apparatus; performing, by the power dividing apparatus, amplitude adjustment for the signals, and outputting multipath signals having an array amplitude and the preset phase to multiple antenna arrays; and transmitting, by the multiple antenna arrays, the multiple signals having the array phase and the array amplitude.

15 Claims, 10 Drawing Sheets

Related U.S. Application Data continuation of application No. PCT/CN2012/074445, filed on Apr. 20, 2012.

(51) Int. Cl.
*H01Q 21/22* (2006.01)
*H01Q 1/24* (2006.01)

(56) References Cited

U.S. PATENT DOCUMENTS

| | | | |
|---|---|---|---|
| 6,173,014 | B1 | 1/2001 | Forssen et al. |
| 6,252,560 | B1 | 6/2001 | Tanaka et al. |
| 8,462,047 | B1* | 6/2013 | Ai et al. ............ 342/372 |
| 2004/0127174 | A1 | 7/2004 | Frank et al. |
| 2006/0267839 | A1 | 11/2006 | Vaskelainen et al. |
| 2008/0143601 | A1 | 6/2008 | Xu |
| 2008/0258993 | A1* | 10/2008 | Gummalla et al. ........ 343/876 |

FOREIGN PATENT DOCUMENTS

| | | |
|---|---|---|
| CN | 2692852 Y | 4/2005 |
| CN | 2703335 Y | 6/2005 |
| CN | 1732638 A | 2/2006 |
| CN | 1921341 A | 2/2007 |
| CN | 201378631 Y | 1/2010 |
| CN | 101848471 A | 9/2010 |
| EP | 1906690 A1 | 4/2008 |
| JP | 63-157507 | 6/1988 |
| JP | 5-299934 A | 11/1993 |
| JP | 06-097731 | 4/1994 |
| JP | 1999-298238 | 10/1999 |
| WO | WO 88/08621 A1 | 11/1988 |

OTHER PUBLICATIONS

Gruszczyński et al., "Reduced Sidelobe Four-Beam N-Element Antenna Arrays Fed by 4×N Butler Matrices" IEEE Antennas and Wireless Propagation Letters, vol. 5, 2006, pp. 430-434.

Hering, "The Design of Hybrid Multiple Beam Forming Networks" Phase-Array Antennas, Proceedings of the Phased Array Antenna Symposium, Jun. 2, 1970, pp. 240-242.

Karavassilis et al., "Experimental HF circular array with direction finding and null steering capabilities" IEE Proceedings Section AAI, vol. 133, No. 2, Apr. 1986, pp. 147-154.

Office Action issued in corresponding Japanese Patent Application No. 2013-515689, mailed May 28, 2013, 5 pages.

Tseng et al., "A Low-Cost 60-Ghz Switched-Beam Patch Antenna Array with Butler Matrix Network" IEEE Antennas and Wireless Propagation Letters, vol. 7, 2008, 4 pages.

International Searching Report issued in corresponding PCT Patent Application No. PCT/CN2012/074445, mailed Jan. 17, 2013.

Notice of Allowance issued in commonly owned U.S. Appl. No. 13/592,149; mailed Jan. 22, 2013.

Written Opinion of the International Searching Authority issued in corresponding PCT Patent Application No. PCT/CN2012/074445, mailed Jan. 17, 2013.

Extended European Search Report issued in corresponding European Patent Application No. 12745987.3, mailed Aug. 2, 2013, 14 pages.

Shelton et al., "Multiple Beams from Linear Arrays" IRE Transactions on Antennas and Propagation 8 pages, Mar. 1, 1961.

Sutton et al., "Design of a K-Thru Ka-band Modified Butler Matrix Feed for a 4-Arm Spiral Antenna" 2010 Loughborough Antennas & Propagation Conference, Nov. 8-9, 2010, 4 pages.

\* cited by examiner

ANTENNA, BASE STATION, AND BEAM PROCESSING METHOD

CROSS-REFERENCE TO RELATED APPLICATIONS

This application is a continuation of U.S. application Ser. No. 13/592,149, filed on Aug. 22, 2012, which is a continuation of International Application No. PCT/CN2012/074445, filed on Apr. 20, 2012, both of which are hereby incorporated by reference in their entireties.

FIELD

The present disclosure relates to antenna technologies, and in particular, to an antenna, a base station, and a beam processing method.

BACKGROUND

With the development of mobile communications, users have higher and higher requirements on the capacity of a communication system. One of the effective methods of effectively increasing the system capacity at low cost is using a multiple-beam antenna to increase sectors for an existing network. Generally, the multiple-beam antenna normally includes a beamforming network and an antenna array connected to the network, where the beamforming network is capable of receiving at least two paths of input signals through a base station signal port, performing phase and amplitude adjustment for the input signals to generate output signals having a preset phase and amplitude, and then outputting the output signals to the antenna array through an antenna signal port; and the antenna array is configured to transmit the output signals by using the beam corresponding to the output signals. Normally, each path of signals corresponds to one beam after the foregoing adjustment is performed. Therefore, the antenna is capable of generating at least two different beams to increase the system capacity.

A typical application structure for the beamforming network of the antenna in the prior art is a Butler (Butler) matrix. For example, the Butler matrix may include six hybrid couplers and four phase shift apparatus, where the six hybrid couplers are categorized into three layers with two hybrid couplers on each layer, and a phase shift apparatus is set between two layers of hybrid couplers to delay output signals of the hybrid couplers for a specific phase and then output the output signals. The Butler matrix may eventually output the output signals having a preset phase and amplitude, and send the output signals to an antenna array. For example, assume that the matrix has four output ports which are respectively connected to four antenna arrays, after input signals are processed by the Butler matrix, the phases of output signals of adjacent output ports may have a 90-degree difference in turn, and the amplitudes of the four paths of output signals are distributed in 0.414:1:1:0.414.

The beamforming network in the foregoing antenna uses too many hybrid couplers and phase shift apparatuses, and the hybrid couplers and phase shift apparatuses are connected by using complex structures, resulting in high cost of antennas at present.

SUMMARY

The present disclosure provides an antenna, a base station, and a beam processing method for reducing the complexity of the beamforming network and the antenna cost.

In a first aspect, the present disclosure provides an antenna, including a beamforming network and multiple antenna arrays, where the beamforming network includes a hybrid network and a power dividing apparatus.

The hybrid network is configured to perform phase adjustment for signals sent by a transceiver to get signals having a preset phase, and send the signals to the power dividing apparatus.

The power dividing apparatus includes multiple antenna signal ports configured to communicate with the antenna arrays, where each antenna signal port is connected to one antenna array; and is configured to perform amplitude adjustment for the signals received from the hybrid network, and output multiple paths of signals having an array amplitude and the preset phase to the multiple antenna arrays.

The multiple antenna arrays are configured to transmit the multipath signals received from the power dividing apparatus, where the transmitted multipath signals have an array phase and the array amplitude; and in the received multipath signals, the preset phase of each path of signals is the same as the array phase of the signals when the signals are transmitted, or the preset phase of at least one path of signals is opposite to the array phase of the signals when the signals are transmitted.

In another aspect, the present disclosure provides a base station, including a transceiver, a feeder line, and the antenna of the present disclosure.

The feeder line is respectively connected to the transceiver and the antenna, and is configured to transmit signals generated by the transceiver to the antenna.

In another aspect, the present disclosure provides a beam processing method, where the method is executed by an antenna, and the antenna includes a beamforming network and multiple antenna arrays; the beamforming network includes a hybrid network and a power dividing apparatus; and the beam processing method includes: performing, by the hybrid network, phase adjustment for signals received from a transceiver, generating signals having a preset phase, and sending the signals to the power dividing apparatus; performing, by the power dividing apparatus, amplitude adjustment for the signals received from the hybrid network, and outputting multipath signals having an array amplitude and the preset phase to the multiple antenna arrays; and transmitting, by the multiple antenna arrays, the multipath signals received from the power dividing apparatus, where the transmitted multipath signals have an array phase and the array amplitude, and in the received multipath signals, the preset phase of each path of signals is the same as the array phase of the signals when the signals are transmitted, or the preset phase of at least one path of signals is opposite to the array phase of the signals when the signals are transmitted.

The antenna, base station, and beam processing method provided by the present disclosure, by setting a power dividing apparatus in a beamforming network of the antenna, simplifies the structure of the beamforming network, thereby reducing the complexity of the beamforming networks and the antenna cost.

DETAILED DESCRIPTION OF THE EMBODIMENTS

In embodiments of the present disclosure, to simplify the structure of a beamforming network in an antenna and reduce the antenna cost, a power dividing apparatus is set in the beamforming network. The power dividing apparatus, for example, is an unequal power dividing apparatus. The unequal power dividing apparatus, for example, may be implemented by using an unequal power divider or an unequal hybrid coupler. Compared with the prior art, where the beamforming network of the prior art has no power dividing apparatus set for performing amplitude adjustment for signals, but only uses an hybrid coupler and a phase shift apparatus to perform amplitude adjustment for signals, complex vector operations are involved in such adjustment mode, and many hybrid couplers and complex connection relationships are required for implementing specific amplitude adjustment. However, embodiments of the present disclosure mainly use a power dividing apparatus to implement amplitude adjustment, which may enable amplitude adjustment for signals to be very convenient, thereby reducing the number of apparatuses such as hybrid couplers, and greatly simplifying the structure of the beamforming network.

Embodiment 1

Figure 1:
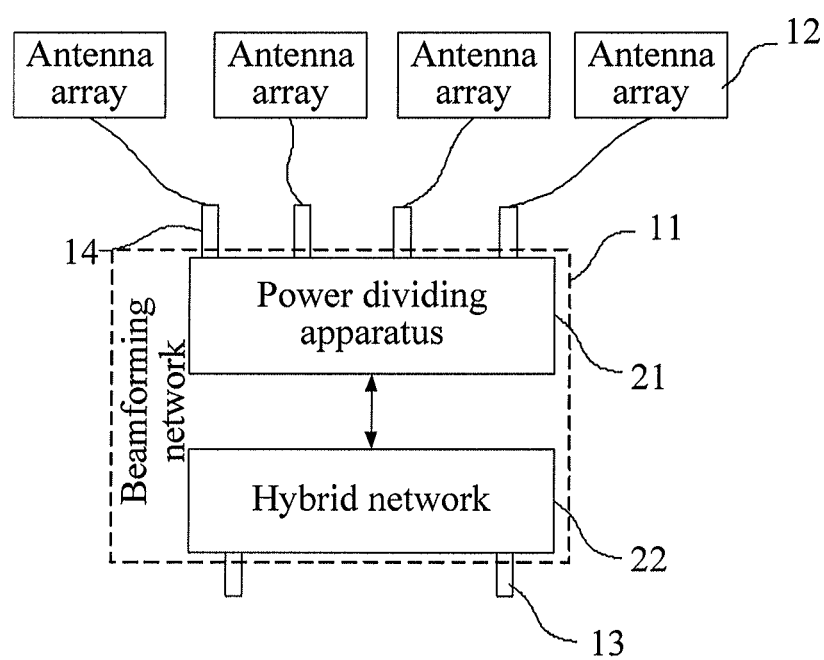
FIG. 1 is a schematic structural diagram of an antenna according to an embodiment of the present disclosure.

FIG. 1 is a schematic structural diagram of an antenna according to an embodiment of the present disclosure. The antenna is an antenna capable of generating multiple beams. For example, a first input signal and a second input signal are respectively input through two base station signal ports of the antenna, and after internal signal processing by the antenna, the first input signal may output an output signal corresponding to a first beam through an output port of the antenna, and the second input signal may output an output signal corresponding to a second beam through an output port of the antenna, thereby generating multiple beams by the antenna.

As shown in FIG. 1, the antenna includes a beamforming network 11 and multiple antenna arrays 12, where the beamforming network 11 includes a hybrid network 22 and a power dividing apparatus 21.

The hybrid network 22 includes base station signal ports 13 for communicating with a base station transceiver. For example, there may be at least two base station signal ports 13. The base station signal ports belong to the hybrid network 22 and are capable of receiving signals sent by the base station transceiver. The hybrid network 22 is configured to perform phase adjustment for the signals received from the base station transceiver, generate signals having a preset phase, and send the signals to the power dividing apparatus 21. The hybrid network 22 may also perform amplitude adjustment for the signals. The signals may be multipath signals which, for example, may be two paths of signals. Each path of signals is output to one power dividing apparatus, and the power dividing apparatus is capable of converting the one path of signals into two paths of signals and outputting the two paths of signals.

The preset phase is a phase obtained after the signals are processed by the hybrid network 22 of the beamforming network. For example, signals sent by the base station transceiver enter the hybrid network 22 through the base station signal ports, and after the phase adjustment performed by the hybrid network 22, the phase obtained is referred to as the preset phase (for example, +180 degrees).

The power dividing apparatus 21 includes multiple antenna signal ports 14 for communicating with the antenna arrays, where each antenna signal port 14 is connected to one antenna array 12; and the power dividing apparatus is configured to perform amplitude adjustment for the signals received from the hybrid network 22, and output multipath signals having an array amplitude and the preset phase to the multiple antenna arrays. Normally, the connecting the antenna signal ports 14 with the antenna arrays 12 means that the antenna signal ports 14 are connected to antenna units in the antenna arrays 12. Specifically, the antenna arrays 12 are normally composed of multiple antenna units, where each antenna unit has a radiator for transmitting signals. The antenna signal ports 14 are actually connected to each antenna unit in the antenna arrays 12. In addition, to allow the antenna arrays to form a corresponding beam together, the antenna arrays 12 of the embodiments have at least one same polarization therebetween, and exemplary antenna arrays 12 in embodiments of the present disclosure are also arrays having the same polarization.

By setting the power dividing apparatus 21, the amplitude adjustment for signals will be very convenient, and the desired amplitude may be obtained directly by adjusting the power dividing apparatus 21. Compared with the amplitude adjustment mode of interconnection vector operations where only equipment such as hybrid couplers is used, this method reduces the number of apparatuses such as hybrid couplers, and greatly simplifies the structure of the beamforming network.

The multiple antenna arrays 12 are configured to receive the multipath signals output by the power dividing apparatus and transmit the multipath signals, where the transmitted multipath signals have an array phase and the array amplitude. The array phase is the phase of the signals to be transmitted by the antenna arrays 12. As shown in FIG. 1, after being output from the hybrid network 22, the signals pass the power dividing apparatus 21, and then are output to the antenna arrays 12 and transmitted by the antenna arrays 12. In the multipath signals received from the power dividing apparatus, the preset phase of each path of signals is the same as the array phase of the signals when the signals are transmitted, or the preset phase of at least one path of signals is opposite to the array phase of the signals when the signals are transmitted. For example, the preset phase of the signals output by the hybrid network 22 is +180 degrees, and the array phase required by the antenna arrays 12 is also +180 degrees, then the phase does not need to be changed after the signals are output from the hybrid network 22, and the signals are directly output to the antenna arrays 12; or the array phase required by the antenna arrays 12 is −180 degrees, where the preset phase is opposite to the array phase, so the phase needs to be adjusted after the signals are output from the hybrid network 22, and the signals are transmitted by the antenna arrays 12 after their phase is converted to −180 degrees. For the detailed phase conversion modes, see subsequent embodiments.

In the following embodiments, firstly, the cases where "the preset phase is opposite to the array phase" and where "the preset phase is the same as the array phase" are described; secondly, for the case where "the preset phase is opposite to the array phase," the modes of "reversal processing by using the reverse array in the antenna array" and of "reversal processing by using a 180-degree phase shifter" are described; and in the specific descriptions, specific structures of four arrays, eight arrays, or six arrays, and the specific structures shown in the accompanying drawings are used as examples, and the process of transmitting signals is used as an example. However, persons skilled in the art should understand that the specific embodiments are not limited to the foregoing structures, and are applicable to the process of receiving signals which is opposite to the process of transmitting signals. In the process of receiving signals, multiple antenna arrays receive multipath signals having an array phase and an array amplitude, a power dividing apparatus performs amplitude adjustment for the multipath signals and then outputs the signals to a hybrid network, the hybrid network performs phase adjustment and amplitude adjustment for the signals and then outputs the signals to a base station transceiver. In the multipath signals received by the power dividing apparatus, a preset phase of each path of signals is the same as the array phase of the signals when the signals are received by the antenna arrays, or the preset phase of at least one path of signals is opposite to the array phase of the signals when the signals are received by the antenna arrays.

Embodiment 2

Figure 2:
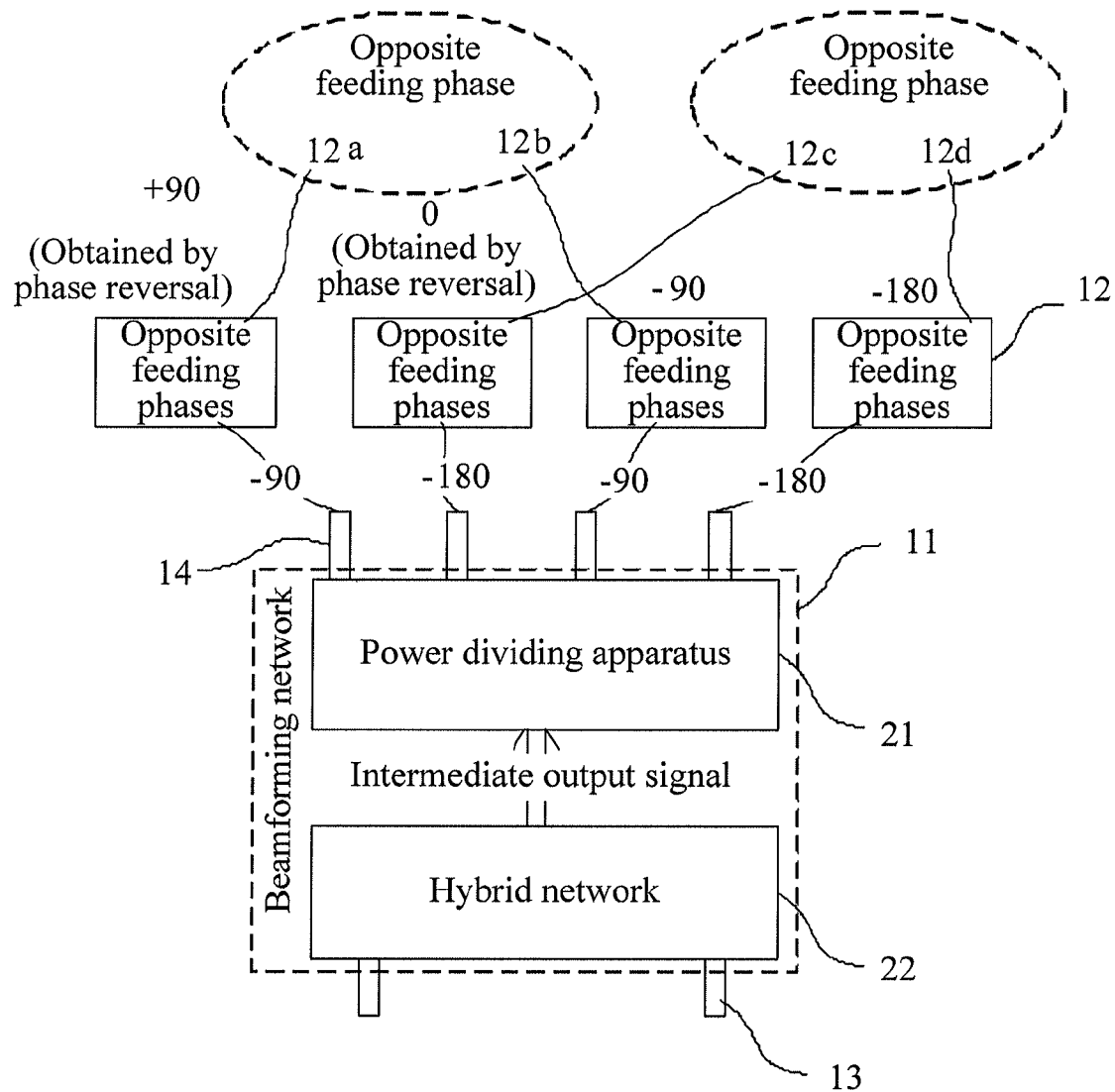
FIG. 2 is a schematic structural diagram of an antenna according to another embodiment of the present disclosure.

FIG. 2 is a schematic structural diagram of an antenna according to another embodiment of the present disclosure. This embodiment is about the case where "the preset phase is opposite to the array phase" and "reversal processing by using the reverse array in the antenna array" is implemented.

As shown in FIG. 2, the antenna has a beamforming network and antenna arrays designed together, where at least one reverse array is set in the antenna arrays, a feeding phase of the reverse array is opposite to feeding phases of other antenna arrays; the reverse array is used as a phase shift unit which is capable of changing a preset phase of the signals received from the beamforming network to an array phase and then transmitting the signals, or changing an array phase of received signals to a preset phase and then sending the signals to the beamforming network. In essence, the phase adjustment for signals is performed together by the reverse array and the beamforming network. The antenna arrays implement a part of the phase adjustment function of the beamforming network, so the structure of the beamforming network is further simplified and the antenna cost is reduced.

The antenna may include a beamforming network 11 and multiple antenna arrays 12 (FIG. 2 shows four antenna arrays as an example), where the beamforming network 11 includes at least two base station signal ports 13 and multiple antenna signal ports 14, and each antenna signal port 14 is connected to an antenna array 12. The base station signal ports 13 refer to ports for communicating with a base station transceiver side, and the antenna signal ports 14 refer to ports for communicating an antenna array side. The beamforming network of the antenna may include a power dividing apparatus 21 and a hybrid network 22. The base station signal ports 13 are set on the hybrid network 22, the antenna signal ports 14 are set on the power dividing apparatus 21, and the power dividing apparatus 21 and the hybrid network 22 are connected.

The antenna includes at least two base station signal ports 13 because the antenna needs to generate multiple beams. Normally, output signals obtained after signals input through each base station signal port 13 and processed by the beamforming network 11 are corresponding to one beam. Therefore, to generate multiple beams, normally there need to be at least two base station signal ports. Generally there are also multiple antenna arrays 12, such as, four antenna arrays or eight antenna arrays, and to ensure the isolation between the antenna arrays, there are specific space intervals between the arrays. Correspondingly, to output the output signals to the antenna arrays, there are also multiple antenna signal ports 14 for connecting with the antenna arrays.

Specifically, the base station signal ports 13 are used to receive input signals sent by the base station transceiver, where the input signals refer to signals of the base station to be transmitted by the antenna. After receiving input signals from the base station signal ports 13, the hybrid network 22 performs phase adjustment and amplitude adjustment for the input signals to generate multipath intermediate output signals, and outputs the multipath intermediate output signals to the power dividing apparatus 21. After receiving the multipath intermediate output signals, the power dividing apparatus 21 is mainly configured to convert the multipath intermediate output signals to multipath output signals, and perform power allocation between the multipath output signals, so that the multipath output signals have a preset amplitude distribution, that is, an array amplitude distribution. For example, the array amplitude distribution for four paths of signals is 0.412:1:1:0.412. The power dividing apparatus 21 outputs the multipath output signals to the multiple antenna arrays 12 through the antenna signal ports 14, where each antenna signal port 14 sends one path of output signals to one antenna array 12.

As described foregoing, in this embodiment, the output signals output by the beamforming network 11 through the antenna signal ports 14 have the array amplitude distribution. However, a difference between the beamforming networks in this embodiment and the prior art lies in that, the output signals received by the beamforming network 11 of this embodiment do not have an array phase required by the antenna arrays, where the array phase refers to a phase of the signals to be transmitted by the antenna arrays to the air (in the process of receiving signals, the array phase refers to a phase of the signals received by the antenna arrays from the air), and in the multipath output signals, a preset phase of at least one path of output signals is opposite to the array phase, while in the prior art, output signals of the beamforming network have a preset array phase distribution, where the preset phase refers to a phase of the signals transmitted by the hybrid network to the power dividing apparatus (in the process of receiving signals, the preset phase refers to a phase of the signals sent by the power dividing apparatus to the hybrid network).

For example, assume that the array phases of the output signals corresponding to the four antenna arrays should be +90 degrees, 0 degree, −90 degrees, and −180 degrees, that is, the difference between adjacent output signals is −90 degrees, output signals of the beamforming network of the prior art already have the foregoing phases, while those of the beamforming network 11 of this embodiment may be −90 degrees, −180 degrees, −90 degrees, and −180 degrees (illustrated in FIG. 2), which are not the array phases, and the preset phases of two paths of output signals are opposite to the preset phase of the arrays. The foregoing array phases are relative values rather than absolute values, that is, phase values of all antenna arrays are normalized against the phase value of one of antenna arrays. The phase values mentioned in this embodiment and the following embodiments are also relative phase values.

The multiple antenna arrays 12 of this embodiment include at least one reverse array, where the reverse array refers to an antenna array whose feeding phase is opposite to a feeding phase of another antenna array, and the reverse array is the phase shift unit. For example, the antenna array 12a and the antenna array 12b shown in FIG. 2 are antenna arrays having opposite feeding phases, where the antenna array 12a performs reversal processing for the phase (−90 degrees) of the corresponding signals to obtain the preset array phase (+90 degrees), while the antenna array 12b does not process the phase of the output signals. In a similar manner, the antenna array 12c and the antenna array 12d shown in FIG. 2 are also antenna arrays having opposite feeding phases, where the antenna array 12c performs reversal processing for the phase (−180 degrees) of the corresponding signals to obtain the preset array phase (0 degree), while the antenna array 12d does not process the phase of the output signals.

After the processing described foregoing, the preset phases "−90 degrees, −180 degrees, −90 degrees, and −180 degrees" of the output signals of the beamforming network 11 is converted to the preset array phases "+90 degrees, 0 degree, −90 degrees, and −180 degrees" by the antenna arrays. So far, the output signals at the antenna arrays have the array amplitude distribution and the array phase distribution, and the signals may be transmitted by using a beam corresponding to the array amplitude and the array phase at the antenna arrays. That is, the four antenna arrays 12 shown in FIG. 2 may form a beam together according to the foregoing array amplitude and array phase distribution.

The following describes the reversal function performed at the forgoing antenna arrays. Before input signals of the base station transceiver are received, the feeding phases of the antenna arrays have been set in advance for phase reversal. The phase reversal for the feeding phases of the foregoing antenna arrays may be implemented by using setting methods commonly known in this field. For example, for half-wave dipole antenna arrays, the connection mode between the inner and outer connectors of a coaxial cable and the feeding point of an oscillator arm may be changed to change the feeding phase of the antenna arrays. For antenna arrays of other types, reversal setting is also performed by using common art and will not be described here. By the reversal setting for the antenna arrays, after signals are received, the antenna arrays perform reversal processing for the phase of the signals, for example, changing the phase by −180 degrees or +180 degrees. For electromagnetic signals which are periodic signals, a signal period is 360 degrees. Therefore, the same effect in essence is obtained by changing the original signals by −180 degrees or +180 degrees.

Based on the foregoing description, in the antenna of this embodiment, a part of functions of the beamforming network of the prior art are actually implemented by the antenna arrays, and the beamforming network and the antenna arrays work together to perform phase adjustment for input signals. That is, the beamforming network of the prior art is capable of adjusting the input signals by itself to obtain output signals having an array phase and an array amplitude; however, the output signals obtained by the beamforming network of this embodiment itself only have an array amplitude, and only a part of the multiple output signals has an array phase (for example, a phase of a path of output signals is −90 degrees, and signals of this phase are supposed to be output to the antenna arrays), but a part of the output signals have phases which are opposite to the array phase (for example, a phase of a path of output signals is −90 degrees, but the phase of signals to be output to the antenna arrays should be +90 degrees); in this case, by using the reversal feature of the antenna arrays, the array phase is obtained after the antenna arrays perform reversal processing for the phases.

The following embodiment 3 and embodiment 4, by using a four-array antenna and an eight-array antenna as examples respectively, describe in detail the solution where the phase shift unit is a reverse array in the antenna arrays. Based on these two embodiments, it is obvious that the structure of the beamforming network using this solution is greatly simplified.

Embodiment 3

Figure 3:
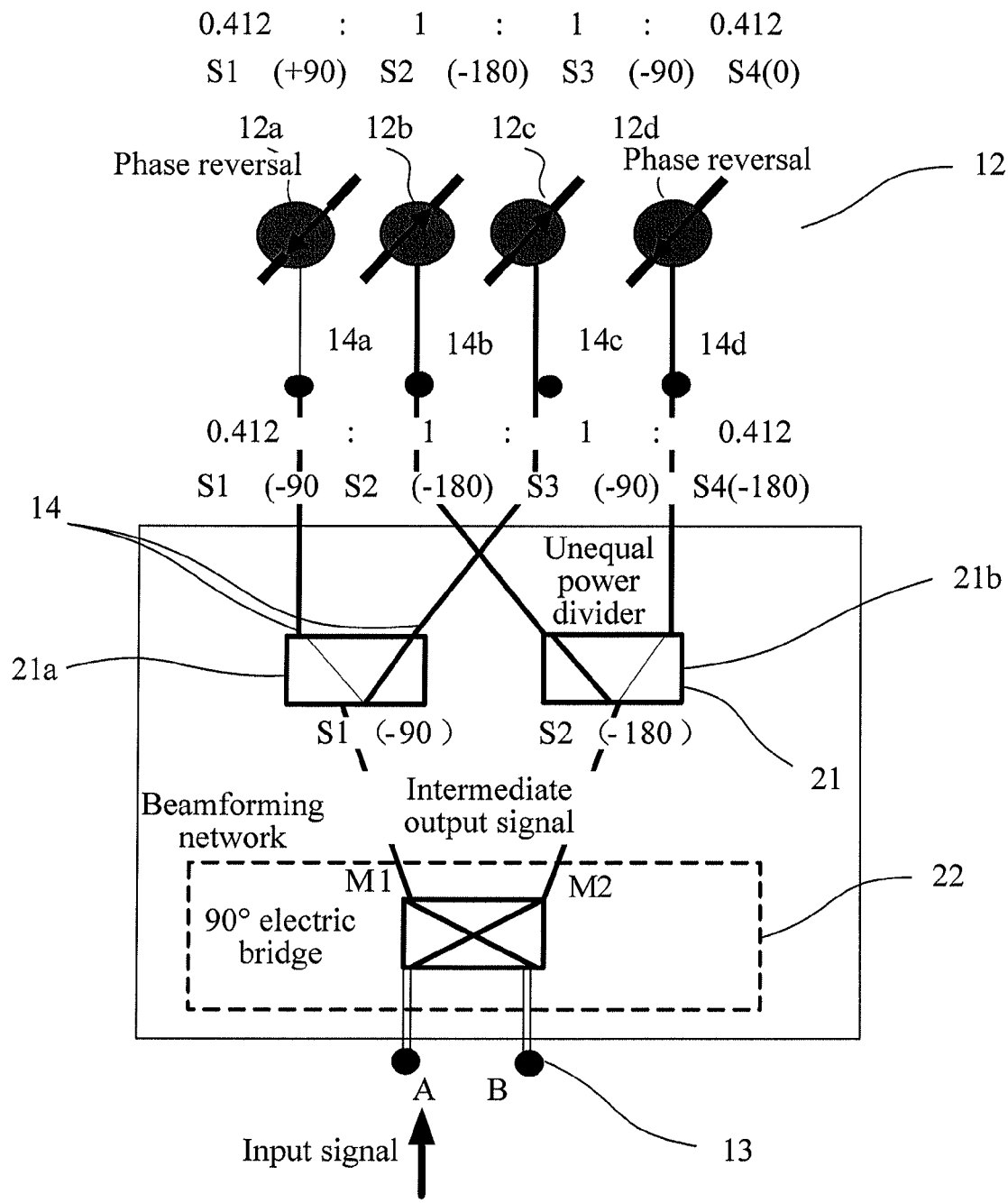
FIG. 3 is a schematic structural diagram of an antenna according to still another embodiment of the present disclosure.

FIG. 3 is a schematic structural diagram of an antenna according to still another embodiment of the present disclosure. This embodiment shows a four-array antenna, that is, an antenna having four antenna arrays 12.

As shown in FIG. 3, the antenna includes four antenna arrays 12 (the shapes indicated by 12a, 12b, 12c, and 12d in the figure represent the antenna arrays). A beamforming network of the antenna includes a hybrid network 22. The hybrid network 22 of this embodiment only uses a 90-degree hybrid coupler. Specifically, other structures may also be used in specific embodiments, for example, a combination of a 180-degree hybrid coupler and a phase shifter may be used. The hybrid network 22 includes two base station signal ports 13 (indicated by A and B in FIG. 3). The beamforming network further includes two power dividing apparatuses (the power dividing apparatuses are, for example, unequal power dividers), which are a first power dividing apparatus 21a and a second power dividing apparatus 21b respectively, and each power dividing apparatus has two antenna signal ports 14. The antenna signal ports of the power dividing apparatuses are connected to the antenna arrays. The connection lines between the four antenna signal ports 14 and the four antenna arrays 12 are respectively represented as 14a, 14b, 14c, and 14d.

The 90-degree hybrid coupler includes two output ports, that is, a first output port M1 and a second output port M2, where the first output port M1 is connected to the first power dividing apparatus 21a, and the second output port M2 is connected to the second power dividing apparatus 21b. Each power divider includes a first output port and a second output port, which are the two antenna signal ports 14 shown in FIG. 3. For example, the two antenna signal ports of the first power dividing apparatus 21a are connected to the antenna arrays 12a and 12c through the connection lines 14a and 14c, and the two antenna signal ports of the second power dividing apparatus 21b are connected to the antenna arrays 12b and 12d through the connection lines 14b and 14d. As shown in FIG. 3, feeding phases of the antenna arrays 12a and 12c are opposite, and feeding phases of the antenna arrays 12b and 12d are opposite. That is, one of the two output ports of the power dividing apparatus is connected to a phase shift unit, namely, the reverse array, and the other is directly connected to the antenna array.

The operating principle of the structure of this embodiment is described as follows by using examples.

Assume that a signal is input through the base station signal port A, and after the 90-degree hybrid coupler of the hybrid network 22 performs phase adjustment and amplitude adjustment for the signal, two paths of intermediate output signals are output. That is, S1(−90) is output through the first output port M1 of the 90-degree hybrid coupler, where S1(−90) represents signal S1 and a phase of the signal S1 is −90 degrees (that is, a preset phase); S2(−180) is output through the second output port M2 of the 90-degree hybrid coupler, where a phase of the signal S2 is −180 degrees (that is, a preset phase). Each path of intermediate output signals is output to a power dividing apparatus. That is, S1(−90) is output to the first power dividing apparatus 21a and S2(−180) is output to the second power dividing apparatus 21b.

Each power dividing apparatus is capable of dividing the received intermediate output signal into two paths of output signals having the same phase. For example, after passing the first power dividing apparatus 21a, S1(−90) is output as S1(−90) and S3(−90), where phases of the two signals are the same and both are −90 degrees as the phase of the initially input S1(−90) (that is, still the preset phase); after passing the second power dividing apparatus 21b, S2(−180) is output as S2(−180) and S4(−180), and similarly, phases of the output signals are the same and both are −180 degrees. However, the power dividing apparatuses changed the signal amplitude allocation, so that the output signals have the preset array amplitude. As shown in FIG. 3, amplitude distribution of the four paths of output signals output through the two power dividers 21a and 21b are the preset amplitude distribution values, that is, 0.412:1:1:0.412.

The four paths of output signals S1(−90), S2(−180), S3(−90), and S4(−180) output by the two power dividers are output to the four antenna arrays respectively through the connection lines 14a, 14b, 14c, and 14d. As shown in FIG. 3, the feeding phases of the antenna arrays 12a and 12c are opposite, the antenna array 12a may perform reversal processing for S1(−90) and convert it to S1(+90) (that is, the array phase). In the similar manner, the feeding phases of the antenna arrays 12b and 12d are opposite, the antenna array 12d may perform reversal processing for S4(−180) and convert it to S4(0) (that is, the array phase).

As shown in FIG. 3, after the processing described foregoing, the signals at the antenna arrays have the preset array phase distribution and the preset array amplitude distribution, and a corresponding beam may be formed at the antenna arrays to transmit the signals.

In addition, the isolation degree between the two base station signal ports of the 90-degree hybrid coupler of this embodiment is high, and the power dividing apparatuses are capable of flexibly adjusting the amplitude of each path of output signals according to actual requirements. If a signal is input through the port B, the antenna processes the signal in a process similar to the foregoing procedure, which is not described repeatedly here. In addition, as described foregoing, the 90-degree hybrid coupler and unequal power dividers in FIG. 3 may be replaced with other structures having equivalent functions.

Based on the foregoing description and as shown in FIG. 3, the beamforming network in this embodiment actually uses only one 90-degree hybrid coupler and two unequal power dividers to implement the array amplitude and array phase at the antenna arrays (the antenna arrays assist in the reversal processing). Compared with the prior art, the prior art normally needs to use six 90-degree hybrid couplers and four phase shifters to implement the preset array amplitude and array phase at the antenna arrays. Hence, it is obvious that this embodiment greatly simplifies the structure of the beamforming network, reduces equipment interconnection complexity inside the network, and correspondingly, also simplifies the antenna structure and reduces the antenna cost.

Embodiment 4

Figure 4:
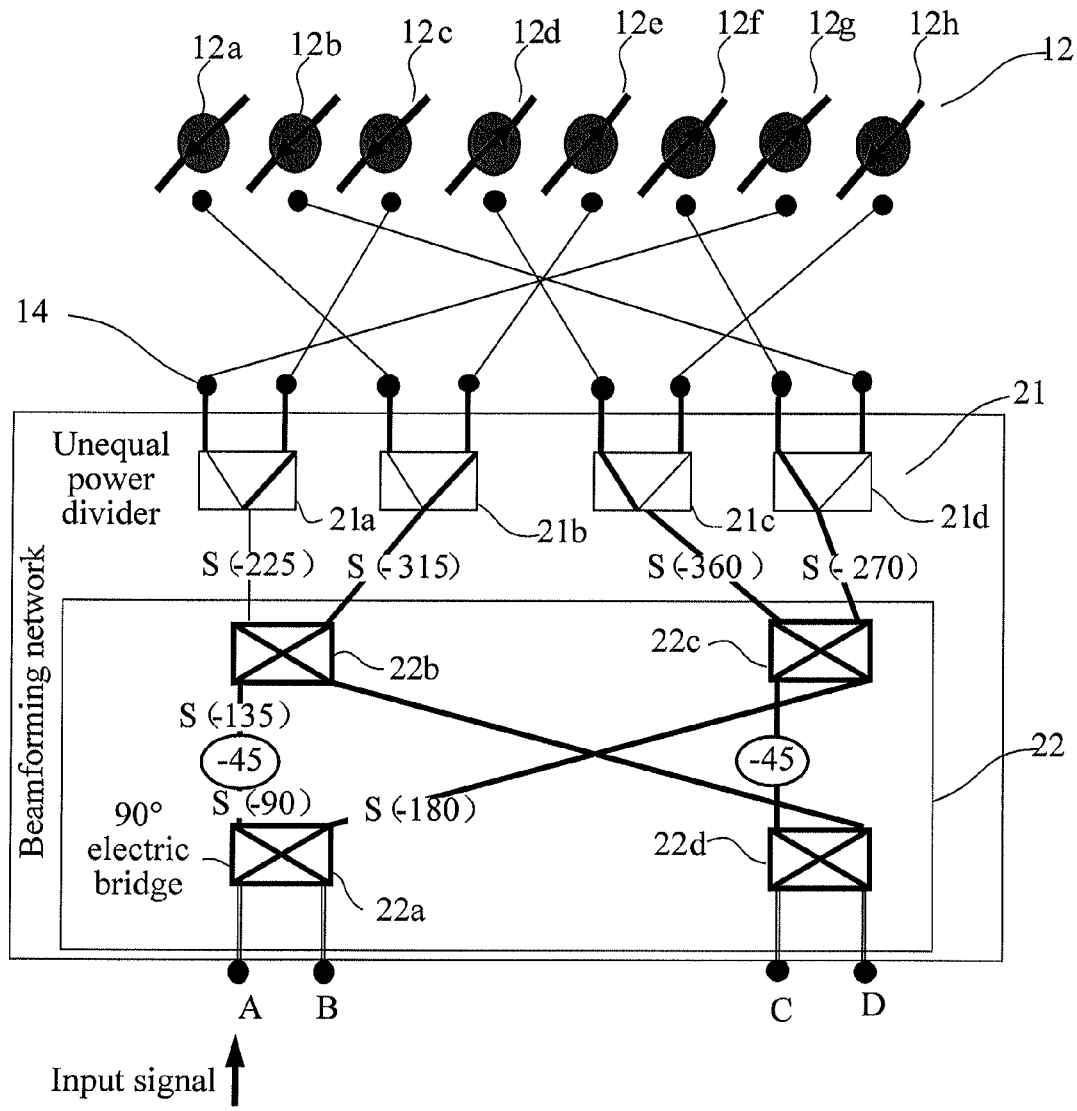
FIG. 4 is a schematic structural diagram of an antenna according to yet another embodiment of the present disclosure.

FIG. 4 is a schematic structural diagram of an antenna according to yet another embodiment of the present disclosure. This embodiment shows an eight-array antenna, that is, an antenna having eight antenna arrays 12.

As shown in FIG. 4, the antenna includes eight antenna arrays 12. A beamforming network of the antenna includes a hybrid network 22. The hybrid network 22 of this embodiment uses four 90-degree hybrid couplers and two −45-degree phase shifters. In particular, the hybrid network 22 includes a first 90-degree hybrid coupler 22a and a second 90-degree hybrid coupler 22d at layer 1, and a third 90-degree hybrid coupler 22b and a fourth 90-degree hybrid coupler 22c at layer 2 (layer 1 or layer 2 indicates the first layer or second layer shown in the figure), where the first 90-degree electric 22a and the third 90-degree hybrid coupler 22b are opposite to each other, and the second 90-degree hybrid coupler 22d and the fourth 90-degree hybrid coupler 22c are opposite to each other. One output port of the first 90-degree hybrid coupler 22a is connected to the third 90-degree hybrid coupler 22b through the −45-degree phase shifter, and another output port is connected to the fourth 90-degree hybrid coupler 22c. One output port of the second 90-degree hybrid coupler 22d is connected to the fourth 90-degree hybrid coupler 22c through the −45-degree phase shifter, and another output port is connected to the third 90-degree hybrid coupler 22b. Each output port of the third 90-degree hybrid coupler 22b and the fourth 90-degree hybrid coupler 22c is connected to a power dividing apparatus.

The beamforming network includes four power dividing apparatuses, which are represented by 21a, 21b, 21c, and 21d respectively. The power dividing apparatuses also use unequal power dividers as examples. Each power dividing apparatus includes a first output port and a second output port. The two output ports are the two antenna signal ports 14 of each power dividing apparatus shown in FIG. 4. The two antenna signal ports of the power dividing apparatus are connected to the antenna arrays, where one is connected to the phase shift unit and the other is connected to the antenna array.

The connection structures of the hybrid couplers, phase shifters, power dividers, and antenna arrays are shown in FIG. 4 and will not be described here. The operating principle of the structure of this embodiment is described as follows by using examples.

Assume that a signal is input through the base station signal port A, after passing the first 90-degree hybrid coupler 22a in the hybrid network 22, the signal outputs two paths of intermediate output signals, namely, S(−90) and S(−180). That is, two paths of signals whose phases are −90 degrees and −180 degrees respectively are output.

After S(−90) passes the −45-degree phase shifter, the phase changes to −135 degrees, that is, S(−135). The S(−135) passes another 90-degree hybrid coupler 22b and outputs S(−225) and S(−315) (that is, preset phases). The S(−225) and S(−315) are respectively input to two unequal power dividers, where S(−225) is input to the power divider 21a and S(−315) is input to the power divider 21b. S(−180) directly enters the fourth 90-degree hybrid coupler 22c, and outputs two signals S(−270) and S(−360) (that is, preset phases) through the two antenna signals ports of the fourth 90-degree hybrid coupler 22c; S(−360) is input to the power divider 21c and S(−270) is input to the power divider 21d.

The four power dividers 21a, 21b, 21c, and 21d are mainly configured to perform amplitude adjustment for received signals, so that output signals have the preset array amplitude distribution. (FIG. 4 does not show the amplitude distribution values, which may be, for example, 0.412/0.412/1/1/1/1/0.412/0.412, or other amplitude distribution values; the amplitude distribution values may be flexibly adjusted by using the unequal power dividers.) The phases of received signals are not changed. Hence, the phases of the signals output by the four power dividers to the eight antenna arrays 12a to 12h are −315, −270, −225, −360, −315, −270, −225, and −360 in order, which are shown in "before phase reversal" in FIG. 4.

In the similar manner, after the output signals reach the antenna arrays, feeding phases of a part of output signals are opposite to the feeding phases of the antenna arrays; therefore, the corresponding antenna arrays will perform reversal processing for this part of output signals. For example, as shown in FIG. 4, the feeding phases of the antenna arrays 12a, 12b, 12c, and 12h are positive, while phases of the corresponding received signals are negative. Therefore, the foregoing antenna arrays may perform reversal for the received output signals to convert the output signals to the array phase. After reversal, the phase distribution of the output signals corresponding to the antenna arrays is −135 (−315+180), −90(−270+180), −45(−225+180), 0 (Actually the phase is not changed but only represented with another value. Because an electromagnetic wave signal is a signal having a period of 360 degree, −360 and 0 are the same in essence. For example, 0 may be obtained as follows: −360+360. One period is 360 degrees, and m×360 may be added, where m is a positive integer, a negative integer, or 0), +45(−315+360), +90(−270+360), +135(−225+360), +180(−360−180+720).

In this embodiment, after a signal is input through the port B, the phases of the signals of the eight antenna arrays have a difference of −135 degrees in turn; after a signal is input through the port C, the phases of the signals of the eight antenna arrays have a difference of 135 degrees in turn, and after a signal is input through the port D, the phases of the signals of the eight antenna arrays have a difference of −45 degrees in turn. The specific signal process and principle are similar to that when the signal is input through the port A, and will not be described repeatedly here. In addition, the isolation degree between the four base station signal ports A, B, C, and D of this embodiment is high, and the power dividers are capable of flexibly adjusting the amplitude of each path of output signals according to actual requirements.

This embodiment greatly simplifies the structure of the beamforming network, reduces equipment interconnection complexity inside the network, and correspondingly, also simplifies the antenna structure and reduces the antenna cost.

In the foregoing Embodiment 3 and Embodiment 4, the reverse array is used as the phase shift unit as an example. In the following embodiment 5, FIG. 5 and FIG. 6 show another solution which is about the case where "the preset phase is opposite to the array phase" and "the phase shift unit is a 180-degree phase shifter, and reversal processing is implemented by using the 180-degree phase shifter."

Embodiment 5

Figure 5:
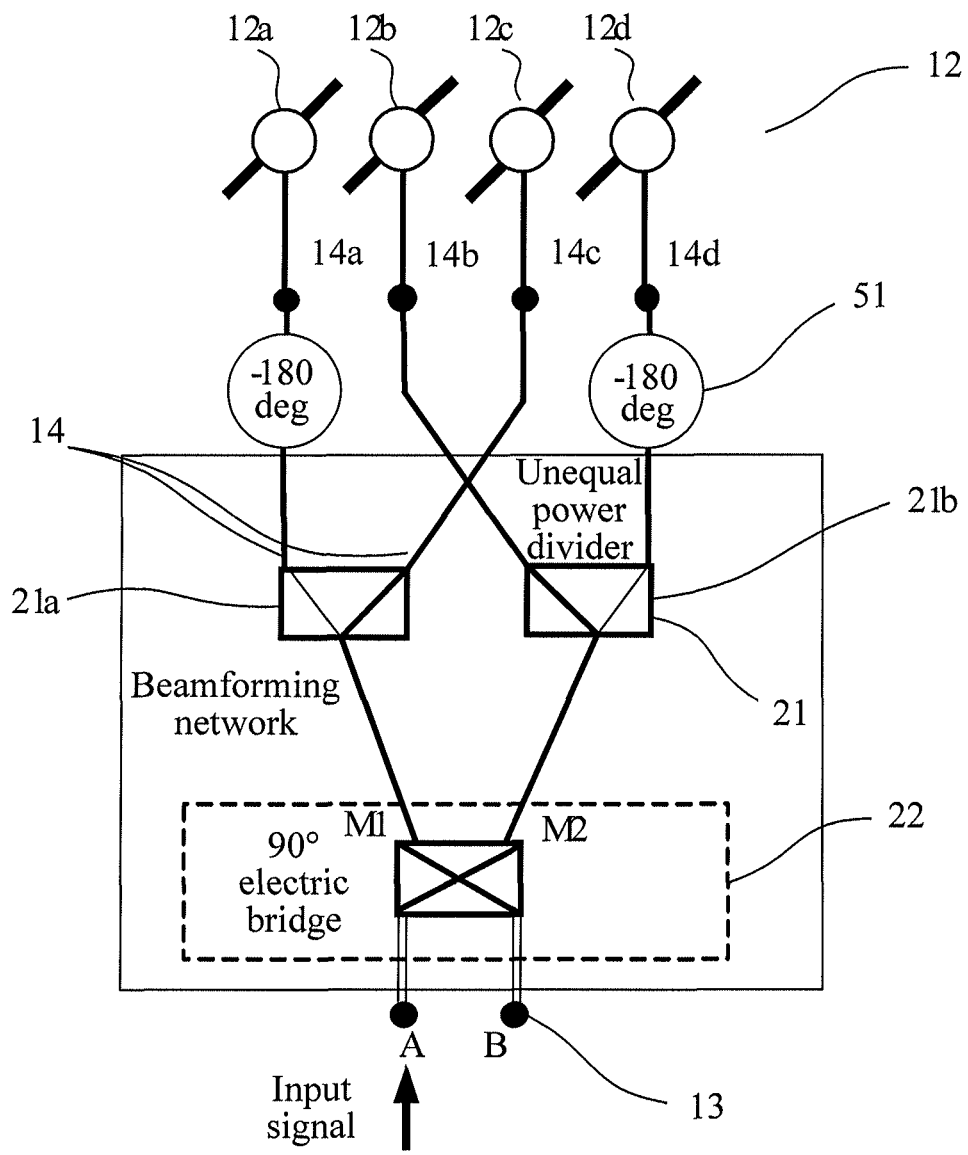
FIG. 5 is a schematic structural diagram of an antenna according to yet another embodiment of the present disclosure.
Figure 6:
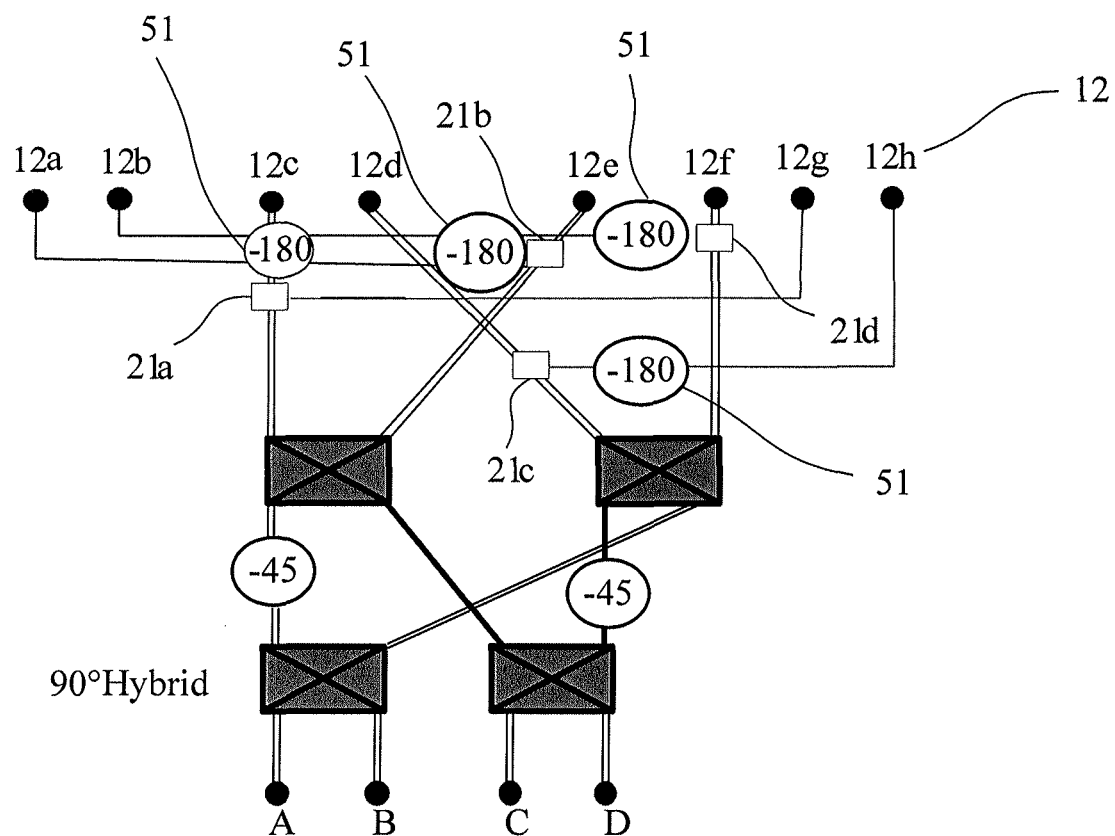
FIG. 6 is a schematic structural diagram of an antenna according to yet another embodiment of the present disclosure.

As shown in FIG. 5 and FIG. 6, a phase shift unit is a 180-degree phase shifter, and the antenna includes at least one 180-degree phase shifter. The 180-degree phase shifter is respectively connected to a power dividing apparatus and an antenna array, and is configured to perform phase reversal for signals having a preset phase opposite to the array phase which are received by the power dividing apparatus, and output the signals to the antenna array, or perform reversal for signals having an array phase opposite to the preset phase which are received by the antenna array, and output the signals to the power dividing apparatus.

FIG. 5 is a schematic structural diagram of an antenna according to still another embodiment of the present disclosure. As shown in FIG. 5, compared with the antenna structure shown in FIG. 3, a major difference of this embodiment lies in that the phase shift unit is a 180-degree phase shifter 51 set between the antenna array and the unequal power divider. In this case, the antenna array is the same as that of the prior art and no reverse array is set. The 180-degree phase shifter 51 is used to perform phase reversal. The operating principle of this antenna is the same as the principle of the antenna shown in FIG. 3 and is not described repeatedly here.

FIG. 6 is a schematic structural diagram of an antenna according to yet another embodiment of the present disclosure. As shown in FIG. 6, compared with the antenna structure shown in FIG. 4, a major difference of this embodiment lies in that the phase shift unit is a 180-degree phase shifter 51 set between the antenna array and the unequal power divider. In FIGS. 6, 21a, 21b, 21c, and 21d are four power dividing apparatuses, for example, unequal power dividers. One of two output ports of each power dividing apparatus is connected to the antenna array through the 180-degree phase shifter 51, and another output port is directly connected to the antenna array. The eight antenna arrays 12a to 12h in FIG. 6 are the same as those of the prior art and no reverse array is set. The 180-degree phase shifter 51 is used to perform phase reversal. The operating principle of this antenna is the same as the principle of the antenna shown in FIG. 4 and is not described repeatedly here.

Embodiment 6

Figure 7:
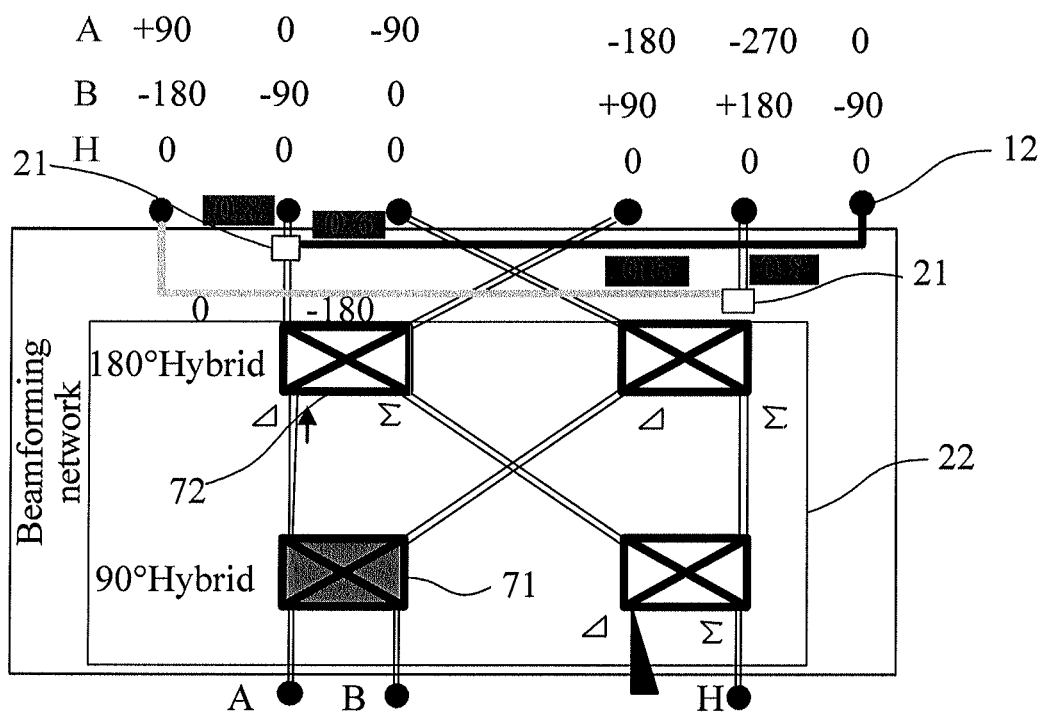
FIG. 7 is a schematic structural diagram of an antenna according to yet another embodiment of the present disclosure.

This embodiment is about the case where "the preset phase is the same as the array phase," and the structure of the six-array antenna in FIG. 7 is used as an example and described.

FIG. 7 is a schematic structural diagram of an antenna according to yet another embodiment of the present disclosure. As shown in FIG. 7, no phase shift unit is required because the preset phase and the array phase are the same in this embodiment. In particular, the antenna includes a beamforming network and antenna arrays 12, where the beamforming network includes a hybrid network 22 and a power dividing apparatus 21.

The hybrid network 22 includes two 90-degree hybrid couplers 71 at layer 1 and two 180-degree hybrid couplers 72 at layer 2. As shown in FIG. 7, each output port of each 90-degree hybrid coupler 71 is connected to a 180-degree hybrid coupler 72; one of two output ports of each 180-degree hybrid coupler 72 is connected to the power dividing apparatus 21, and another output port is directly connected to the antenna array 12. Each output port of the power dividing apparatus 21 is connected to one antenna array. No phase reversal is required for this embodiment; therefore, the power dividing apparatus 21 only performs amplitude adjustment for the received signals. For example, as shown in FIG. 7, the received signals are divided into two paths of signals of 0.8:0.6.

The antenna of the structure in this embodiment is configured to transfers signals of a port A, a port B, and a port H respectively to the antenna arrays, and enables the output array phases of the antenna arrays for signals input through the port A have a difference of −90 degrees in turn, the output array phases of the antenna arrays for signals input through the port B have a difference of 90 degrees in turn, and the output array phases of the antenna arrays for signals input through the port H to be the same. Meanwhile, the isolation degree between the three ports A, B, and H is high. In addition, this embodiment may also allow a part of the hybrid network in the beamforming network to be directly connected to the antenna arrays, and a part to be connected to the antenna arrays through a power dividing apparatus.

The foregoing embodiments describe the solutions of the present disclosure in detail by using the process of transmitting signals as an example. Persons skilled in the art should understand that the antenna may also receive signals, that is, after receiving signals, the antenna arrays transfer the signals to the beamforming network. The processing for receiving signals is opposite to the processing for transmitting signals. The following merely briefly describe the processing for receiving signals: for example, when multiple array phases are opposite to a preset phase, a phase shift unit changes array phases of signals received by the antenna arrays to the preset phase and outputs the signals to a power dividing apparatus, the power dividing apparatus performs amplitude adjustment for the received multipath signals having the preset phase and outputs the multipath signals to a hybrid network, and the hybrid network performs phase adjustment and amplitude adjustment for the multipath signals and then outputs the multipath signals to a base station transceiver. Because the power dividing apparatus is used, the antenna structure according to embodiments of the present disclosure is simplified for the process either of transmitting signals or of receiving signals.

Embodiment 7

Figure 8:
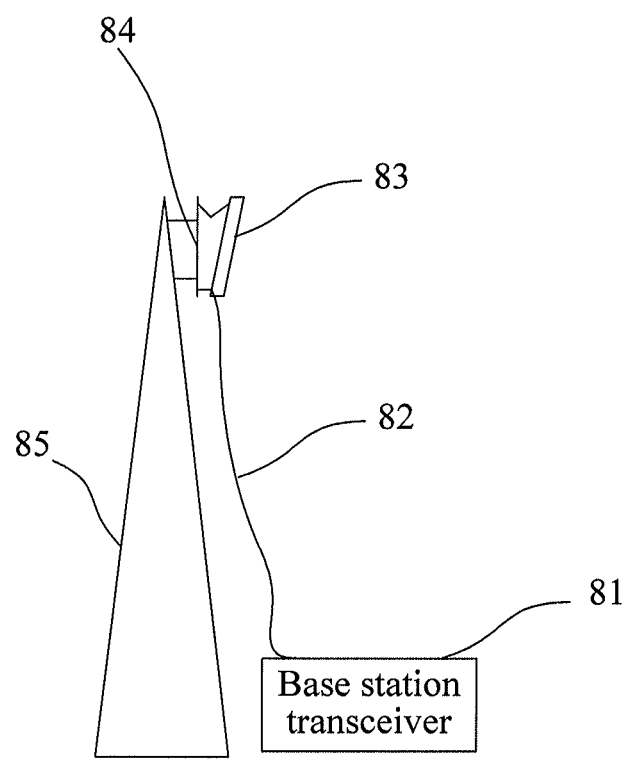
FIG. 8 is a schematic structural diagram of a base station according to an embodiment of the present disclosure.

FIG. 8 is a schematic structural diagram of a base station according to an embodiment of the present disclosure. As shown in FIG. 8, the base station includes a base station transceiver 81, a feeder line 82, and an antenna 83, where the antenna 83 may be an antenna according to any embodiment of the present disclosure.

The antenna 83 is normally fixed on a pole 84, and then fixed on an iron tower 85 together with the pole 84. The feeder line 82 is respectively connected to the base station transceiver 81 and the antenna 83. The base station transceiver 81 is configured to generate input signals which are signals to be transmitted by the base station. The feeder line 82 is configured to transfer the input signals generated by the base station transceiver 81 to the antenna 83. The antenna 83 converts the input signals into output signals and transmits the output signals.

For the detailed process of processing input signals by the antenna in the base station of this embodiment, see the description of any antenna embodiment of the present disclosure. By setting a power dividing apparatus in a beamforming network of the antenna to perform amplitude adjustment for signals, the structure and connection complexity of the beamforming network are simplified, thereby reducing the antenna cost, and corresponding reducing the construction cost of the base station.

Embodiment 8

Figure 9:
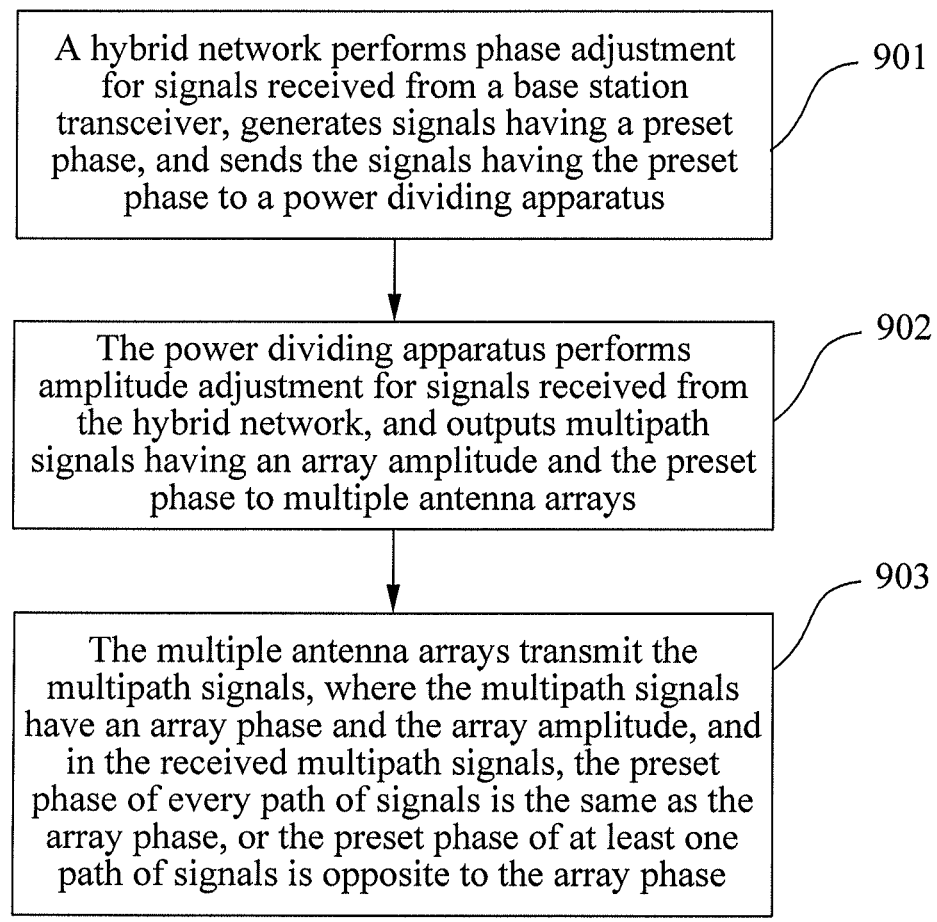
FIG. 9 is a schematic flowchart of a beam processing method according to an embodiment of the present disclosure.

FIG. 9 is a schematic flowchart of a beam processing method according to an embodiment of the present disclosure. The beam processing method of this embodiment may be executed by the antenna of any embodiment of the present disclosure. Hence, the description of antenna embodiments may be referenced for the specific principle of this method. This embodiment only briefly descries the method.

The antenna includes a beamforming network and multiple antenna arrays which are connected together. The beamforming network includes a hybrid network and a power dividing apparatus which are connected together. As shown in FIG. 9, this embodiment uses the process of transmitting signals as an example, and the beam processing method may include:

901: The hybrid network performs phase adjustment for signals received from a base station transceiver, generates signals having a preset phase, and sends the signals having the preset phase to the power dividing apparatus;

902: The power dividing apparatus performs amplitude adjustment for signals received from the hybrid network, outputs multipath signals having an array amplitude and the preset phase, and then outputs the multipath signals to the multiple antenna arrays; and

903: The multiple antenna arrays transmit the multipath signals, where the transmitted multipath signals have an array phase and the array amplitude, and in the received multipath signals, the preset phase of each path of signals is the same as the array phase of the signals when the signals are transmitted, or the preset phase of at least one path of signals is opposite to the array phase of the signals when the signals are transmitted.

When the preset phase of at least one path of signals in the multipath signals is opposite to the array phase, correspondingly, after the power dividing apparatus performs amplitude adjustment for the multipath signals received from the hybrid network, and before the multiple antenna arrays transmit the multipath signals, the method further includes:

a reverse array in the antenna arrays performs phase reversal for the signals whose preset phase is opposite to the array phase, so that the phase of the signals is changed from the preset phase to the array phase, where a feeding phase of the reverse array is opposite to feeding phases of other antenna arrays; or a 180-degree phase shifter performs phase reversal for the signals whose preset phase is opposite to the array phase, so that the phase of the signals is changed from the preset phase to the array phase, where the 180-degree phase shifter is located between the power dividing apparatus and the antenna arrays, and is respectively connected to the power dividing apparatus and the antenna arrays.

Figure 10:
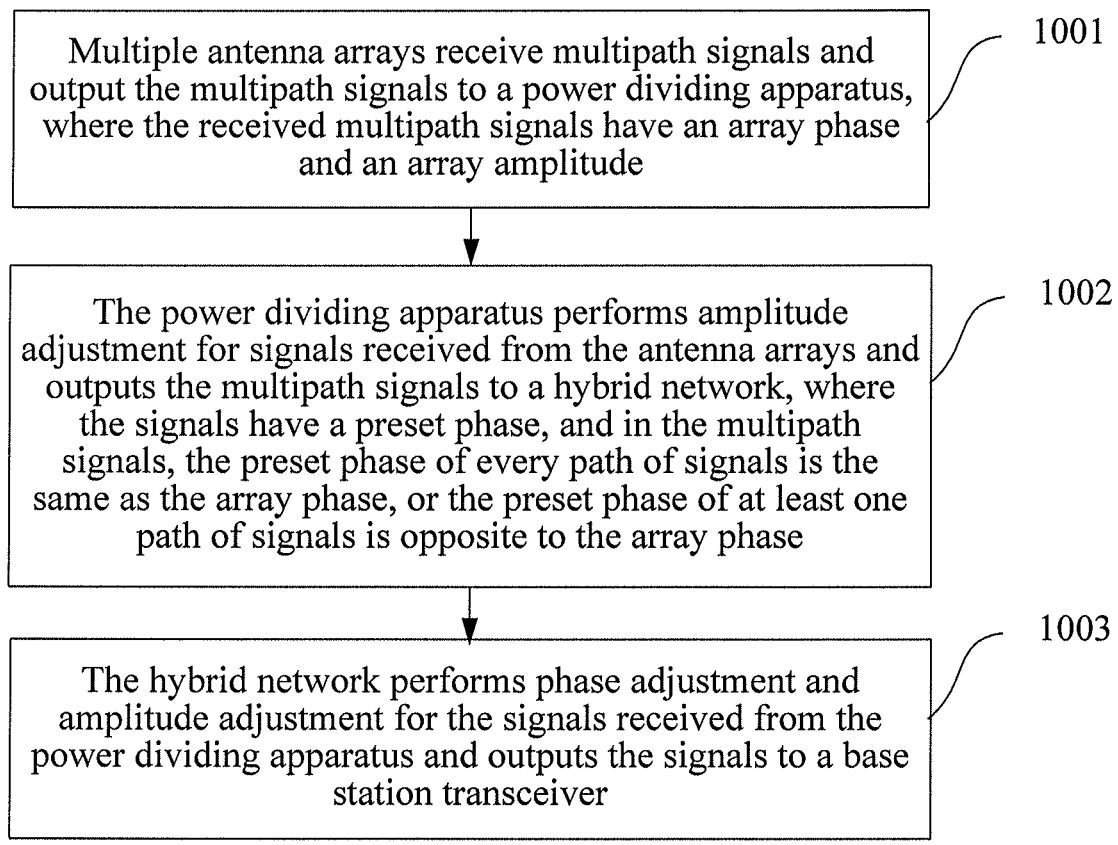
FIG. 10 is a schematic flowchart of a beam processing method according to another embodiment of the present disclosure.

FIG. 10 is a schematic flowchart of a beam processing method according to another embodiment of the present disclosure. This embodiment uses the process of receiving signals as an example, and the beam processing method may include:

1001: The multiple antenna arrays receive multipath signals and output the multipath signals to the power dividing apparatus, where the received multipath signals have the array phase and the array amplitude.

1002: The power dividing apparatus performs amplitude adjustment for the multipath signals received from the multiple antenna arrays and outputs the signals to the hybrid network, where the multipath signals received by the power dividing apparatus have the preset phase, and in the multipath signals received by the power dividing apparatus, the preset phase of each path of signals is the same as the array phase of the signals when the signals are received by the antenna arrays, or the preset phase of at least one path of signals is opposite to the array phase of the signals when the signals are received by the antenna arrays.

1003: The hybrid network performs phase adjustment and amplitude adjustment for the signals received by the power dividing apparatus and outputs the signals to the base station transceiver.

When the preset phase of at least one path of signals in the multipath signals is opposite to the array phase, correspondingly, after the multiple antenna arrays receive the multipath signals, and before the power dividing apparatus performs amplitude for the multipath signals received by the multiple antenna arrays, the method further includes:

performing, by a reverse array in the antenna arrays, phase reversal for the signals whose preset phase is opposite to the array phase, so that the phase of the signals is changed from the array phase to the preset phase, where a feeding phase of the reverse array is opposite to feeding phases of other antenna arrays; or performing, by a 180-degree phase shifter, phase reversal for the signals whose preset phase is opposite to the array phase, so that the phase of the signals is changed from the array phase to the preset phase, where the 180-degree phase shifter is located between the power dividing apparatus and the antenna arrays, and is respectively connected to the power dividing apparatus and the antenna arrays.

In the beam processing method according to this embodiment, the power dividing apparatus in the beamforming network of the antenna performs amplitude adjustment for signals, so that the beamforming process is simplified, and the complexity and cost of the beamforming network is reduced.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium includes various mediums which are capable of storing program codes, such as a ROM, a RAM, a magnetic disk, or a CD-ROM.

Finally, it should be noted that the foregoing embodiments are merely provided for describing the technical solutions of the present disclosure, but not intended to limit the present disclosure. It should be understood by persons of ordinary skill in the art that although the present disclosure has been described in detail with reference to the embodiments, modifications may be made to the technical solutions described in the embodiments, or equivalent replacements may be made to some technical features in the technical solutions; however, such modification or replacement does not make the essence of corresponding technical solutions exceed the scope of the technical solutions according to the embodiments of the present disclosure.

The invention claimed is:

1. A base station antenna, comprising a beamforming network and multiple antenna arrays; wherein:
   the beamforming network comprises a hybrid network and a power dividing apparatus;
   the hybrid network comprises multiple input signal ports for communicating with a transceiver of a base station, and is configured to receive signals from the transceiver, perform phase adjustment on received signals and send signals to the power dividing apparatus;
   the power dividing apparatus comprises multiple output signal ports for communicating with the antenna arrays, wherein each output signal port is connected to one antenna array; and is configured to receive signals from the hybrid network, perform amplitude adjustment on received signals and output signals to the multiple antenna arrays; and
   the multiple antenna arrays comprise at least one reverse array, and are configured to receive signals from the power dividing apparatus and transmit received signals, wherein each reverse array is configured to perform phase reversal on a signal to be transmitted by the reverse array with the aid of a different connection configuration of a feeding point than other antenna arrays.

2. The antenna according to claim 1, wherein the number of reverse arrays is two, and the power dividing apparatus comprises a first power dividing apparatus and a second power dividing apparatus; wherein:
   the hybrid network comprises a 90-degree hybrid coupler, wherein the 90-degree hybrid coupler comprises a first output port and a second output port, the first output port is connected to the first power dividing apparatus, and the second output port is connected to the second power dividing apparatus; and
   each power dividing apparatus comprises a first output port and a second output port, wherein the first output port is connected to the reverse array, and the second output port is connected to another antenna array other than the reverse array.

3. The antenna according to claim 1, wherein the number of reverse arrays is four, and the number of power dividing apparatuses is four;
   the hybrid network comprises a first 90-degree hybrid coupler and a second 90-degree hybrid coupler at layer 1, and a third 90-degree hybrid coupler and a fourth 90-degree hybrid coupler at layer 2, the first 90-degree hybrid coupler and the third 90-degree hybrid coupler are opposite to each other, and the second 90-degree hybrid coupler and the fourth 90-degree hybrid coupler are opposite to each other;
   an output port of the first 90-degree hybrid coupler is connected to the third 90-degree hybrid coupler through a −45-degree phase shifter, and another output port is connected to the fourth 90-degree hybrid coupler; an output port of the second 90-degree hybrid coupler is connected to the fourth 90-degree hybrid coupler through a −45-degree phase shifter, and another output port is connected to the third 90-degree hybrid coupler; each output port of the third 90-degree hybrid coupler and the fourth 90-degree hybrid coupler is connected to one power dividing apparatus; and
   each power dividing apparatus comprises a first output port and a second output port, wherein the first output port is connected to the reverse array, and the second output port is connected to another antenna array other than the reverse array.

4. The antenna according to claim 1, wherein:
   the multiple antenna arrays are further configured to receive signals and output received signals to the power dividing apparatus, wherein each reverse array is configured to perform phase reversal on a signal received by the reverse array using a different connection configuration of a feeding point than other antenna arrays;

the power dividing apparatus is further configured to receive signals from the multiple antenna arrays, perform amplitude adjustment on received signals and output signals to the hybrid network; and the hybrid network is further configured to receive signals from the power dividing apparatus, perform phase adjustment on received signals and output signals to the transceiver.

5. A base station, comprising a transceiver, a feeder line, and an antenna, wherein:

the feeder line is respectively connected to the transceiver and the antenna, and is configured to transmit signals generated by the transceiver to the antenna;

the antenna comprises a beamforming network and multiple antenna arrays;

the beamforming network comprises a hybrid network and a power dividing apparatus;

the hybrid network is configured to receive signals from the transceiver, perform phase adjustment on received signals and send signals to the power dividing apparatus;

the power dividing apparatus is connected to one antenna array; and is configured to receive signals from the hybrid network, perform amplitude adjustment on received signals and output signals to the multiple antenna arrays; and the multiple antenna arrays comprise at least one reverse array, and are configured to receive signals from the power dividing apparatus and transmit received signals, wherein each reverse array is configured to perform phase reversal on a signal to be transmitted by the reverse array using a different connection configuration of a feeding point than other antenna arrays.

6. The antenna according to claim 1, wherein the multiple antenna arrays have at least one same polarization.

7. The antenna according to claim 1, wherein the multiple antenna arrays are half-wave dipole antenna arrays.

8. The antenna according to claim 1, wherein the number of signals transmitted by the multiple antenna arrays is four, and an array amplitude distribution for the four signals is 0.412:1:1:0.412.

9. The antenna according to claim 1, wherein the number of signals transmitted by the multiple antenna arrays is eight, and an array amplitude distribution for the eight signals is 0.412:0.412:1:1:1:1:0.412:0.412.

10. The base station according to claim 5, wherein the number of reverse arrays is two, and the power dividing apparatus comprises a first power dividing apparatus and a second power dividing apparatus; wherein:

the hybrid network comprises a 90-degree hybrid coupler, wherein the 90-degree hybrid coupler comprises a first output port and a second output port, the first output port is connected to the first power dividing apparatus, and the second output port is connected to the second power dividing apparatus; and each power dividing apparatus comprises a first output port and a second output port, wherein the first output port is connected to the reverse array, and the second output port is connected to another antenna array other than the reverse array.

11. The base station according to claim 5, wherein the number of reverse arrays is four, and the number of power dividing apparatuses is four;

the hybrid network comprises a first 90-degree hybrid coupler and a second 90-degree hybrid coupler at layer 1, and a third 90-degree hybrid coupler and a fourth 90-degree hybrid coupler at layer 2, the first 90-degree hybrid coupler and the third 90-degree hybrid coupler are opposite to each other, and the second 90-degree hybrid coupler and the fourth 90-degree hybrid coupler are opposite to each other;

an output port of the first 90-degree hybrid coupler is connected to the third 90-degree hybrid coupler through a −45-degree phase shifter, and another output port is connected to the fourth 90-degree hybrid coupler; an output port of the second 90-degree hybrid coupler is connected to the fourth 90-degree hybrid coupler through a −45-degree phase shifter, and another output port is connected to the third 90-degree hybrid coupler; each output port of the third 90-degree hybrid coupler and the fourth 90-degree hybrid coupler is connected to one power dividing apparatus; and each power dividing apparatus comprises a first output port and a second output port, wherein the first output port is connected to the reverse array, and the second output port is connected to another antenna array other than the reverse array.

12. The base station according to claim 5, wherein the multiple antenna arrays have at least one same polarization.

13. The base station according to claim 5, wherein the multiple antenna arrays are half-wave dipole antenna arrays.

14. The base station according to claim 5, wherein the number of signals transmitted by the multiple antenna arrays is four, and an array amplitude distribution for the four signals is 0.412:1:1:0.412.

15. The base station according to claim 5, wherein the number of signals transmitted by the multiple antenna arrays is eight, and an array amplitude distribution for the eight signals is 0.412:0.412:1:1:1:1:0.412:0.412.

* * * * *